United States Patent [19]
Kelly

[11] Patent Number: 5,230,437
[45] Date of Patent: Jul. 27, 1993

[54] VIEWPORT ASSEMBLY
[75] Inventor: Glenn R. Kelly, Broken Arrow, Okla.
[73] Assignee: General Signal Corporation, Stamford, Conn.
[21] Appl. No.: 825,027
[22] Filed: Jan. 24, 1992
[51] Int. Cl.[5] .............................................. B65D 53/00
[52] U.S. Cl. .................................... 220/237; 220/254; 220/327; 220/377; 138/89
[58] Field of Search ............... 220/233, 234, 235, 236, 220/237, 254, 315, 319, 327, 328, 377, 602, 662, 663, 664; 248/27.1; 138/89, 90, 91

[56] References Cited
U.S. PATENT DOCUMENTS

| | | | |
|---|---|---|---|
| 922,508 | 5/1909 | Puffer | 220/377 |
| 2,342,186 | 2/1944 | Fischer | 220/328 |
| 2,396,469 | 3/1946 | Meigs | 220/328 |
| 2,461,989 | 2/1949 | LeRoy | 220/663 |
| 2,917,924 | 12/1959 | Messick | 220/663 X |
| 3,379,332 | 4/1968 | Anderson | 220/327 X |
| 3,613,936 | 10/1971 | Kaiser et al. | 138/89 X |
| 3,625,390 | 2/1972 | Meginnis | 220/663 X |
| 3,951,301 | 4/1976 | Meginnis | 220/328 |
| 4,312,708 | 1/1982 | Leslie | 138/89 X |
| 4,585,033 | 4/1986 | Westman | 138/89 |
| 4,809,862 | 3/1989 | Carty | 220/377 X |
| 4,968,197 | 11/1990 | Chen | 138/90 X |
| 5,035,265 | 7/1991 | Chen | 138/89 |
| 5,038,830 | 8/1991 | Arnaud | 138/89 |
| 5,044,403 | 9/1991 | Chen | 138/89 |

Primary Examiner—Allan N. Shoap
Assistant Examiner—Stephen Cronin
Attorney, Agent, or Firm—Paul H. Johnson; Raymond E. Smiley

[57] ABSTRACT

A viewport assembly having a tubular member, such as a ullage tube, with an internal cylindrical surface, a frame ring with an outer and an inner circumferential surface, the outer surface being defined in part by an outwardly radially extending flange portion and the frame ring having a plurality of spaced apart bolt holes therethrough, a gland ring having an integral forwardly extending tubular portion, the tubular portion being telescopically receivable on the frame ring outer circumferential surface rearwardly of the flange portion and providing an annular area externally of the frame ring between the frame ring flange and the gland ring tubular portion forward end, a transparent window disc sealably received within the frame ring, and a bolt for each of the bolt holes in the frame ring threadably engaging matching threaded bolt holes in the gland ring so that as the bolts are tightened the gland ring is drawn onto the frame ring, compressing the packing ring to expand it outwardly into sealing engagement with the tubular member internal cylindrical surface.

28 Claims, 4 Drawing Sheets

VIEWPORT ASSEMBLY

BACKGROUND OF THE INVENTION

It is frequently necessary in industrial and transportation applications to have access to the interior of storage compartments. A typical example of such is an ullage tube, that is, a tubular member extending from the top of a bulk storage area providing access to the storage area. Such ullage tubes frequently are provided with hinged closures. In many instances it is desirable that the storage compartments be observable through such ullage tubes. For this reason, many applications exist wherein sight glasses or viewport assemblies are required in conjunction with ullage tubes.

While others have provided viewport assemblies for ullage tubes, the devices which have been heretofore in common commercial practice have not been entirely successful. In today's economically sensitive environment more effective sealing of storage compartments is required. In addition, modern transportation facilities have a greater emphasis on cleanliness and sanitation which have not been easily accomplished with previously employed viewport assemblies.

The present disclosure is an improved viewport assembly for use in conjunction with an ullage tube or any such similar tubular access. An object of the present disclosure is to provide a viewport assembly that more effectively seals an ullage tube to prevent the escape of liquids and/or gases from within the storage area to which the ullage tube connects and, in like manner, to prevent contamination by fluids, gases, dust, or other foreign material from passing through the ullage tube into the storage compartment.

In order to improve cleanliness, an object of this disclosure is to provide a viewport assembly for an ullage tube including a transparent window removably fittable within the ullage tube and in which the entire assembly presents a substantially flush surface coincident with the end of the ullage tube to thereby minimize water and other contaminants that might collect on top of the closed ullage tube.

SUMMARY OF THE INVENTION

This disclosure relates to a viewport assembly particularly applicable for removably closing an ullage tube but more broadly applicable to removably closing any opening having an internal cylindrical surface. The assembly includes a frame ring having an outer end and an inner end, and having an outer and an inner circumferential surface. The outer circumferential surface is defined in part by an outwardly radially extending flange portion adjacent the frame ring outer end. The outside diameter of the frame ring flange portion is less than the internal diameter of the cylindrical surface to be closed by the viewport assembly. The frame ring also has a plurality of spaced apart bolt hole openings therethrough.

A transparent window disc having a cylindrical edge is secured within the frame ring internal cylindrical surface. In one embodiment the window disc is sealed by positioning the disc between an integral inwardly radially extending flange portion of the frame ring and a snap ring which is secured within a groove within the frame ring internal cylindrical surface. In another embodiment the internal cylindrical surface of the frame ring is internally threaded and receives an externally threaded window retaining ring, the window retaining ring having an inwardly extending flange portion. The transparent window disc is held in place within the inner circumferential surface of the frame ring as the window retaining ring is threaded into the frame ring.

A gland ring is provided having a forward and a rearward end and having an outer diameter less than the diameter of the tubular opening to be closed by the assembly. The gland ring forward end has an integral forwardly extending tubular portion having a forward end. The gland ring tubular portion is telescopically received on the frame ring outer circumferential surface rearwardly of the frame ring radially outwardly extending flange portion. This assembly provides an annular area external of the frame ring and between the flame ring outwardly radially extending flange portion and the gland ring tubular forwardly extending portion.

An elastomeric packing ring is positioned on the exterior of the frame ring within the annular area, that is, between the frame ring integral radially outwardly extending flange portion and the gland ring forwardly extending tubular portion.

The gland ring has a threaded opening therethrough in register with each of the bolt hole openings in the frame ring. A bolt is positioned through the bolt hole openings and threaded into the threaded openings of the gland ring. As the bolts are tightened the gland ring is drawn onto the frame ring, compressing and radially extending the elastomeric packing ring to squeeze it into sealed contact with the internal cylindrical surface of the tubular member. The packing ring thus serves the dual function of physically positioning the assembly within the tubular member and sealably closing the tubular member against the passage of liquids, gases or solids such as dirt, sand or the like. In a preferred arrangement the transparent window disc has an integral reduced external diameter portion which conforms in dimensions with the frame ring annular inner radially extending flange portion to provide a planar surface encompassing both the frame ring outer end and the window disc outer surface. In the embodiment wherein a separate window retaining ring is used such construction of the transparent window disc also provides for a flush outer surface of the assembly.

A better understanding of the disclosure herein will be had from the following specification and claims, taken in conjunction with the attached drawings.

DESCRIPTION OF THE DRAWINGS

FIG. 1 is rotated 90 degrees clockwise from its normally used position. However, the invention herein is not limited to an arrangement wherein the ullage tube is vertically extending. FIG. 1 shows the closure assembly positioned within the interior of the ullage tube but not in sealed or secured position.

DESCRIPTION OF THE PREFERRED EMBODIMENTS

Referring to the drawings and first to FIGS. 1, 2 and 3, an embodiment of the ullage tube viewport assembly will be described.

A tubular member is indicated by the numeral 10 and has an internal cylindrical surface 12. The tubular member 10 may be any apparatus having a cylindrical opening therethrough that is to be sealably closed by an assembly and, in the illustrated embodiment, by an assembly which provides a viewport. However, it is understood that the invention is not limited to the provision of a viewport but is more broadly concerned with a means of removably closing and sealing a member having an internal cylindrical surface.

Figure 1:
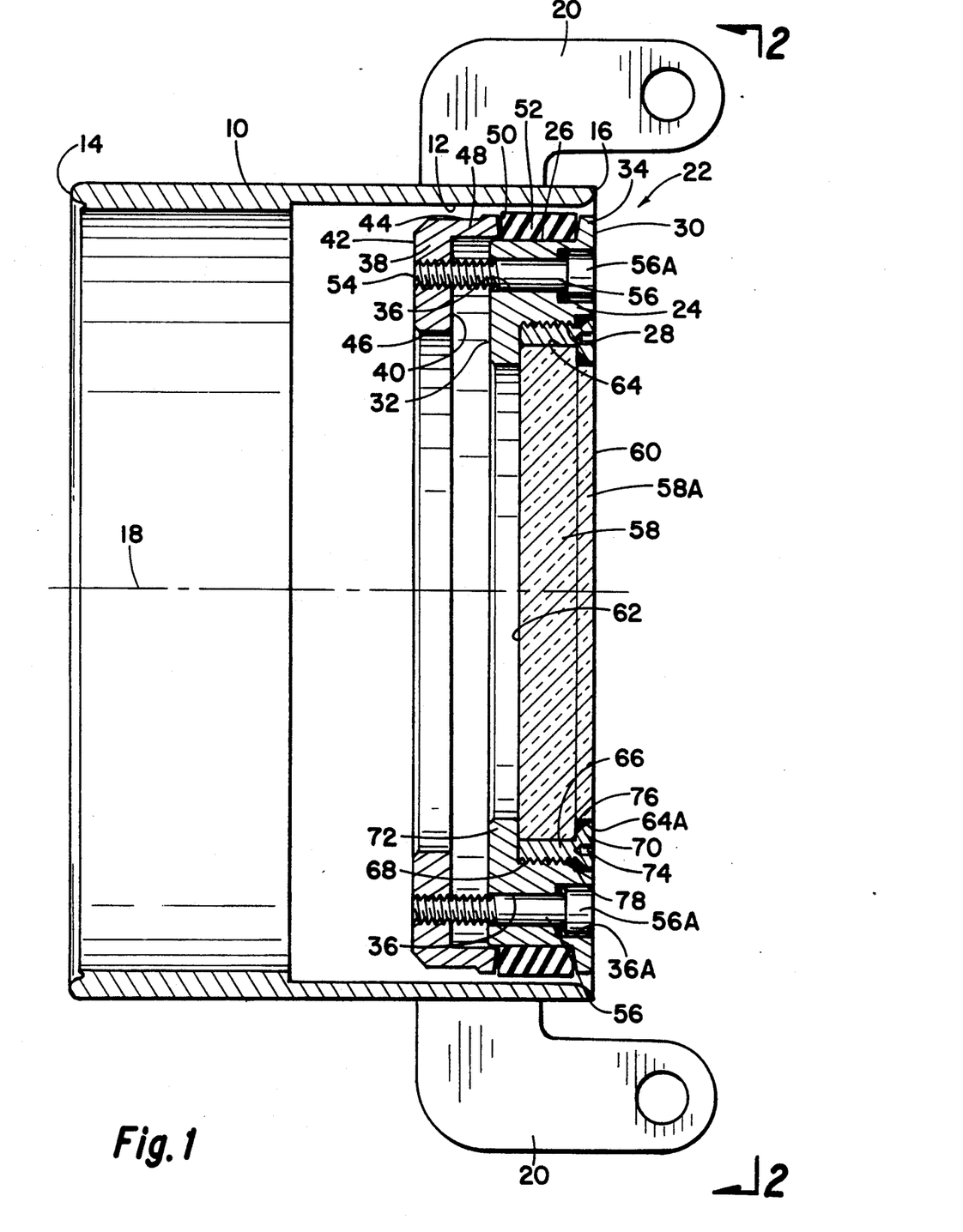
FIG. 1 is an elevational cross-sectional view of a tubular member, representative of an ullage tube, with a viewport assembly positioned therein. Ullage tubes typically extend perpendicularly upwardly from a storage area and in which case

In the typical ullage tube as illustrated in FIG. 1 the tubular inner end 14 may be welded or otherwise secured to an enclosure having an opening therethrough so that ullage tube 10 provides a passageway into such enclosure. Ullage tube 10 has an outer end 16 that is planar and is in a plane normal to the ullage tube tubular axis 18.

Flanges 20 are typically affixed to the exterior of ullage tube 10 as a means of securing a hatch to cover the outer end 16 of the ullage tube. The hatch is not shown and flanges 20 are not related to the ullage tube viewport assembly which is the subject of this disclosure—they are illustrated only as typical of the environment in which the ullage tube viewport is employed.

Figure 2:
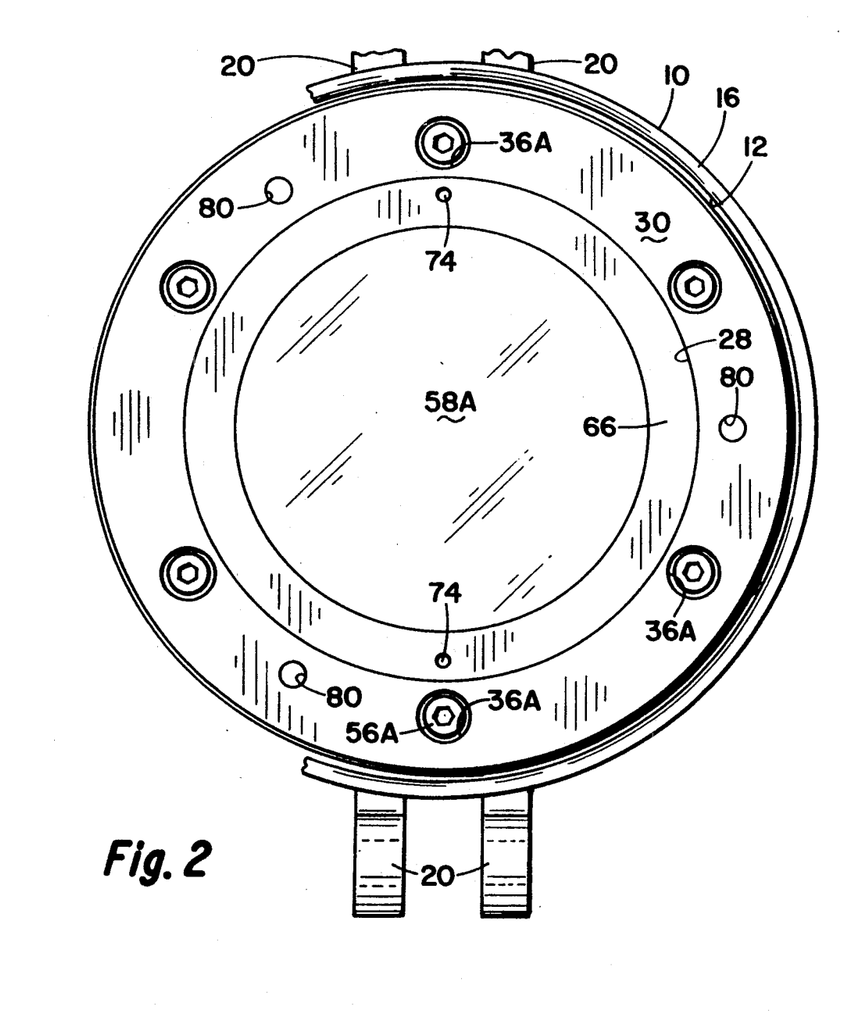
FIG. 2 is an elevational view as taken along the line 2—2 of FIG. 1 looking into the end of a ullage tube. In the typical application of the apparatus of this disclosure FIG. 2 would constitute a horizontal plan view.
Figure 3:
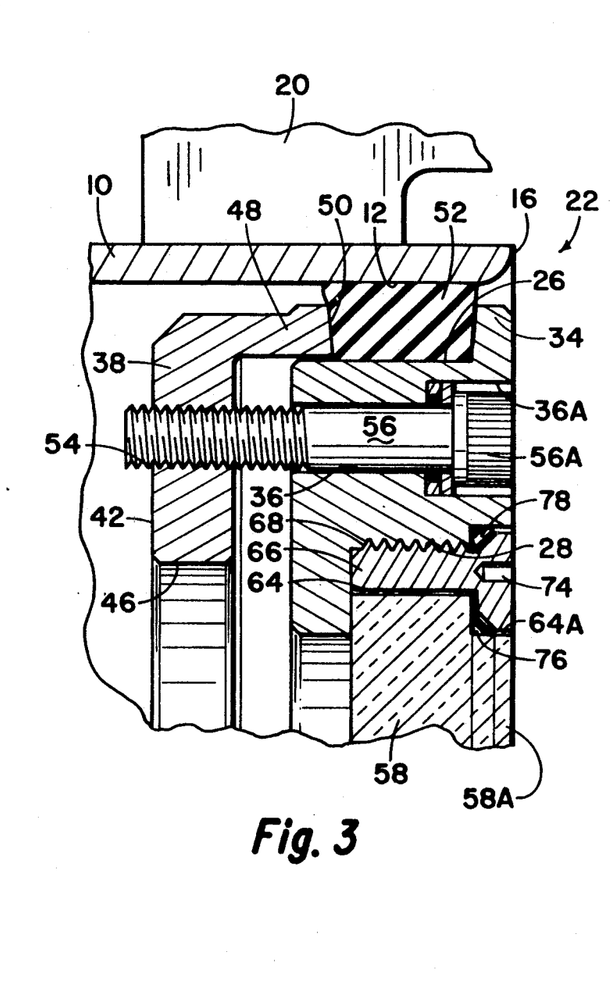
FIG. 3 is an enlarged fragmentary view of the arrangement of FIG. 1 showing the assembly in position and wherein the elastomeric packing ring has been squeezed into outward sealed engagement with the tubular member internal cylindrical surface to physically secure the viewport assembly within the tubular member in a manner to seal the tubular member against the passage of liquids, gases or solids.

The closure assembly is indicated generally by the numeral 22 and includes, as a basic component, a frame ring 24 having an outer cylindrical surface 26, an inner cylindrical surface 28 which, in the embodiment of FIGS. 1, 2, and 3 is internally threaded, an outer end 30 and an inner end 32.

The frame ring outer cylindrical surface 26 includes an integral radially outwardly extending flange portion 34 at the frame ring outer end 30. A plurality of spaced apart bolt holes 36 are formed in the frame ring, six of such bolt holes being indicated in FIG. 2. In the preferred arrangement the bolt holes have an enlarged diameter portion 36A at the frame ring outer end 30, such enlarged diameter portions being seen in FIG. 2.

The next basic component of the closure assembly 22 is a gland ring 38 having a forward end 40, a rearward end 42, an outer cylindrical surface 44 and an inner cylindrical surface 46. The gland ring forward end has an integral forwardly extending tubular portion 48 having a forward end 50.

The gland ring tubular portion 48 is slideably and telescopically receivable on the frame ring outer cylindrical surface 26. An annular area is thereby provided between the gland ring tubular portion forward end 50 and the frame ring integral flange portion 34. An elastomeric packing ring 52 is positioned within such annular area.

The gland ring 38 has a plurality of spaced apart threaded openings 54 that are in register with openings 36 in the frame ring.

A bolt 56 having a head 56A is received within each of the frame ring bolt openings 36 and threadably received in each of gland ring threaded openings 54, with the bolt heads 56A received in the bolt opening enlarged portions 36A.

FIG. 3 shows the bolts 56 threadably tightened to draw the gland ring toward frame ring 24, squeezing the packing ring 52 so that it is expanded outwardly into secure sealed engagement with the tubular member internal cylindrical surface 12.

The frame ring supports a transparent window disc 58 therein. The window disc 58 has a front surface 60, a rear surface 62 and a cylindrical surface 64. In the preferred arrangement window disc 58 is defined by an integral reduced diameter portion 58A adjacent front surface 60 providing a circumferential ledge 64A.

Means must be provided for retaining window disc 58 in position within the frame ring 24. In the embodiment of FIGS. 1, 2, and 3 a window retaining ring 66 is employed. The ring 66 has an outer circumferential surface having external threads 68 thereon that threadably engage frame ring threaded inner cylindrical surface 28. The retaining ring has an integral inwardly extending flange portion 70 of a thickness substantially equal to that of the window disc reduced diameter portion 58A.

Frame ring 24 has an integral inwardly extending flange portion 72 at the frame ring inner end 32. Window disc 58 is received between the window retaining ring flange portion 70 and frame ring flange portion 72. Spanner wrench recesses 74 are formed in the window retaining ring by which it is threaded into frame ring 24.

To securely seal the closure assembly 22, O-rings 76 and 78 are positioned at the opposite ends of the window retaining ring flange portion 70.

FIG. 2 shows three threaded openings 80 in the frame ring outer end 30 spaced between the bolt holes 36. The openings 80 do not extend the full thickness of frame ring 24 and are provided to receive the threaded end of bolts (not shown) which serve merely to support the closure assembly 22 in proper position within tubular member 10 while bolts 56 are tightened. After the closure member is in proper position within the tubular member such bolts are removed from openings 80.

Figure 4:
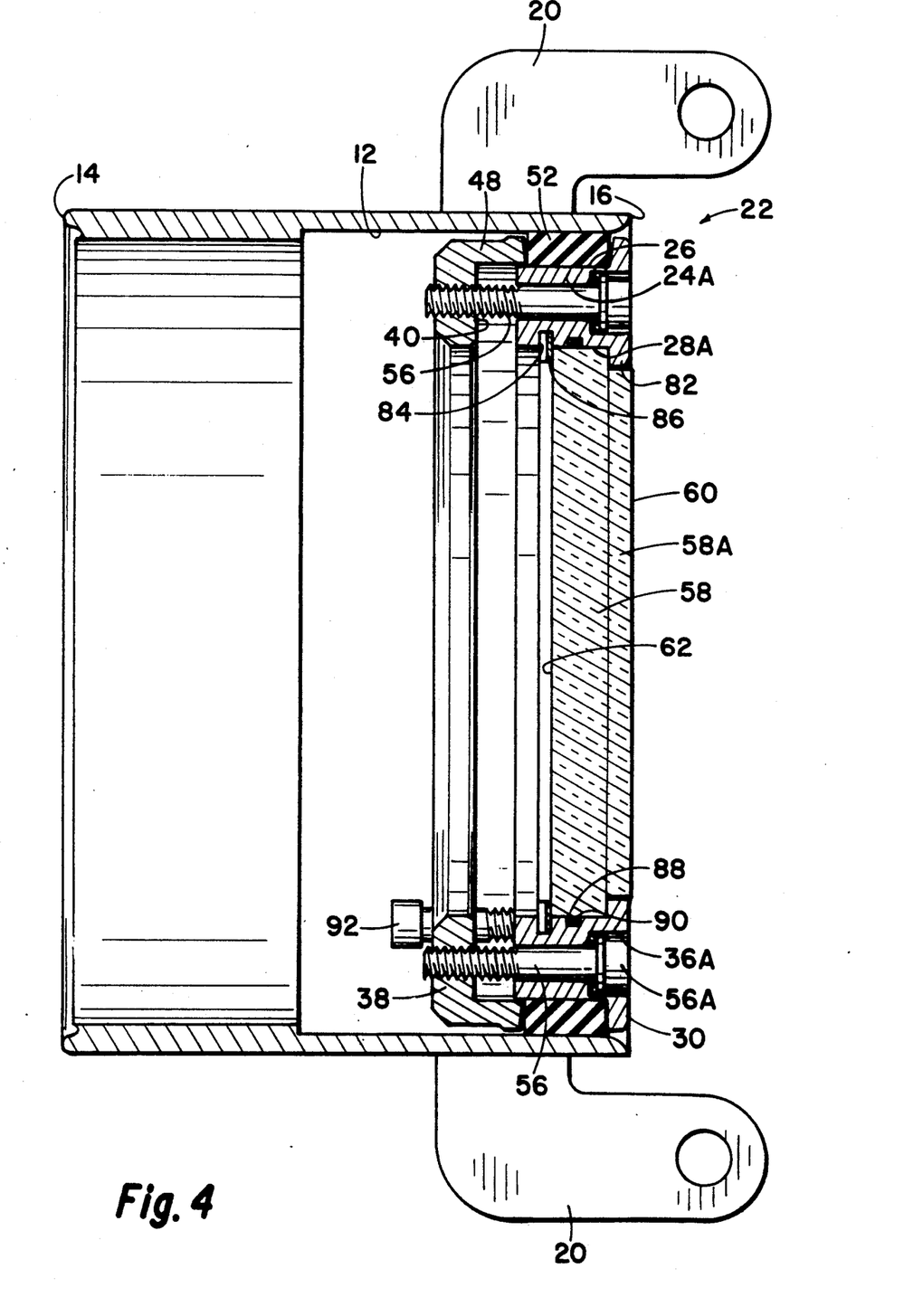
FIG. 4 is an external elevational view as in FIG. 1 of a viewport assembly employing an alternative means of mounting the transparent window disc within the frame ring and showing the assembly in closed or sealed condition wherein the elastomeric packing ring is expanded into outward engagement with the tubular member internal cylindrical surface.
Figure 5:
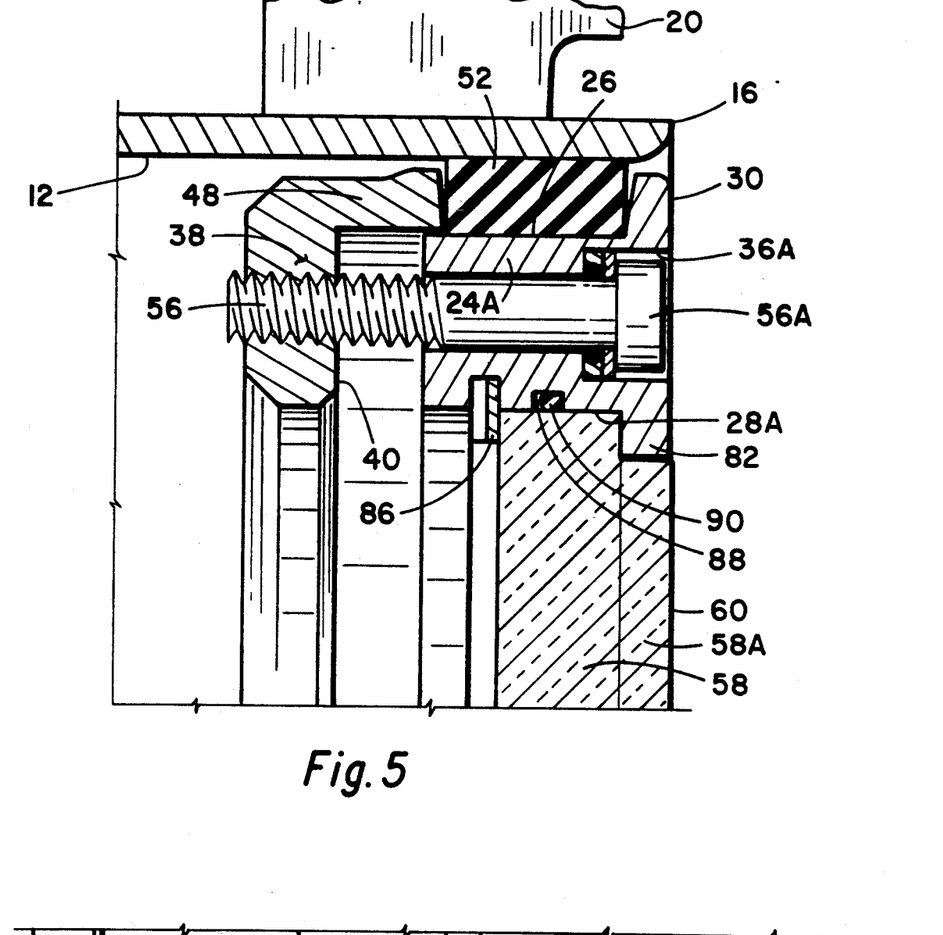
FIG. 5 is an enlarged fragmentary view as in FIG. 3 but showing the embodiment of FIG. 4.

FIGS. 4 and 5 show an alternate arrangement for supporting window disc 58 within frame ring 24A. In the embodiment of FIGS. 4 and 5 frame ring 24A has the same configuration on the outer cylindrical surface 26 as described with reference to FIGS. 1, 2 and 3 but has a different internal cylindrical surface. In the embodiment of FIGS. 4 and 5, the inner cylindrical surface 28A is not threaded and the frame ring has an inwardly radially extending integral flange 82 at frame ring outer end 30. The thickness of integral flange 82 is equal the reduced diameter portion 58A of the window disc.

The inner cylindrical surface 28A is further defined by a circumferential groove 84 that receives a retaining ring which may be in the form of a wave ring 86 by which the window disc 58 is held in position, that is, the window disc is positioned between the retaining ring 86 and the frame ring inward flange 82.

As shown in the embodiment of FIGS. 4 and 5, the frame ring inner cylindrical surface 28A also includes a second groove 88 that receives O-ring 90 to provide a seal between the window disc external cylindrical surface and the internal cylindrical surface of the frame ring.

The means of retaining window disc 58 within the frame ring of FIGS. 4 and 5 has advantages over the embodiment of FIGS. 1-3 since it eliminates the large diameter threaded areas required for the internal cylindrical surface of frame ring 24 and the external cylindrical surface of window retaining ring 66.

To remove the closure assembly 22 from tubular member 10, bolts 56 are loosened to allow the gland ring to move away from frame ring 24. It can be seen that the operator could easily inadvertently completely unthread all of bolts 56, and particularly when the tubular member 10 extends vertically the gland ring could drop down into the tubular member and perhaps pass on downwardly into the storage compartment with which the tubular member communicates. To prevent this inadvertence, retaining bolts 92 are employed, only one of which is seen in FIGS. 4 and 5. Normally, two such bolts are required spaced 180 degrees apart. Each of bolts 92 extends through openings (not seen) in the gland ring, and the bolts are threaded into threaded recesses (not seen) in the frame ring inner end 32. The gland ring is free to move on such bolts 92 as it is tightened or loosen to either compress packing 52 or to remove compression therefrom, such bolts 92 simply serving to prevent the gland ring from being inadvertently separated from the closure assembly 22 if all of the bolts 56 are completely removed.

The use of retaining bolts 92 would also be employed with the embodiment of FIGS. 1-3.

Figure 6:
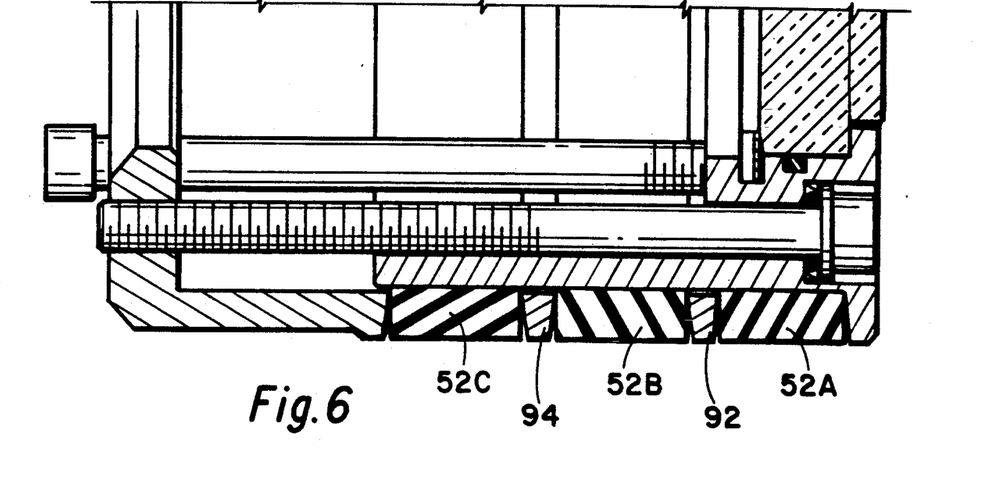
FIG. 6 is an enlarged fragmentary embodiment as in FIG. 5 showing an alternate embodiment employing three separate packing rings. The tubular member in which the assembly is positioned is not shown in FIG. 6.

FIG. 6 shows an alternate embodiment of the viewpoint assembly of FIGS. 4 and 5, the only difference being the employment of multiple (three) packing rings 52A, 52B and 52C. A spacer ring 92 separates packing rings 52A and 52B and is provided with a tapered configuration in cross-section as shown so that as the packing rings are squeezed they tend to expand outwardly into increased contact with the internal cylindrical surface 12 of the tubular member in which the viewport assembly is positioned.

A second spacer ring 94 separates packing rings 52B and 52C for the same purpose.

FIG. 6 is illustrative of the fact that two, three or more packing rings may be employed to sealably support the viewport assembly in a tubular member. Generally speaking, plural packing rings as in FIG. 6 are used when it is necessary to support the viewport assembly against increased pressure that would tend to push the viewport assembly out of the tubular member.

The ullage tube viewport assembly described herein provides a highly effective and easy to install or remove method of sealably closing a tubular member, and with the employment of a window disc 58 provides visual access into the tubular member and into any compartment with which the tubular member communicates.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A viewport assembly comprising
   a tubular member having an internal cylindrical surface;
   a frame ring having an outer end and an inner end and having an outer circumferential surface and an inner circumferential surface, the outer circumferential surface being defined in part by an outwardly radially extending flange portion adjacent said frame ring outer end, and having a plurality of spaced apart openings therethrough extending from said outer to said inner end, the diameter of said flange portion being less than the diameter of said tubular member internal cylindrical surface;
   a window disc having a cylindrical edge and outer and inner surfaces;
   means of securing said window disc to said frame ring inner circumferential surface;
   a gland ring having a forward and a rearward end and having an outer diameter less than the diameter of said tubular member internal cylindrical surface, the forward end having an integral forwardly extending tubular portion having a forward end, the gland ring tubular portion being telescopically receivable on said frame ring outer circumferential surface rearwardly of said flange portion and providing an annular area external of said frame ring between said frame ring flange and said gland ring tubular portion forward end, the gland ring having a plurality of spaced apart threaded openings therein in register with frame ring openings;
   an elastomeric packing ring received on said frame ring outer cylindrical surface between said integral flange and said gland ring tubular portion forward end; and
   a bolt received in each of said frame ring openings and threadably engaging said gland ring threaded openings whereby as the bolts are tightened said gland ring is drawn towards said frame ring, compressing said packing ring into outwardly expanded sealed contact with said tubular member internal cylindrical surface.

2. A viewport assembly according to claim 1 wherein said frame ring has an integral inner annular flange portion at said outer end thereof and wherein said window disc outer surface is defined by an integral, reduced external diameter portion providing a circumferential ledge substantially conforming to the frame ring inner annular flange portion.

3. A viewport assembly according to claim 2 wherein said frame ring inner circumferential surface has an annular groove therein spaced from said frame ring inner annular flange portion; and
   an O-ring received in said annular groove compressibly engaging said window disc cylindrical edge.

4. A viewport assembly according to claim 2 wherein said frame ring inner circumferential surface has an annular groove therein spaced from said frame ring inner annular flange portion; and a locking ring positioned in said annular groove and in engagement with said window disc inner surface, said frame ring inner flange portion and said locking ring serving as said means of securing said window member disc to said frame ring.

5. A viewport assembly according to claim 1 wherein said frame ring outwardly extending flange portion has an inner surface that is inclined outwardly at an angle in the direction towards said frame ring outer end and wherein said gland ring tubular portion forward end is inclined at an angle towards said gland ring rearward end whereby said annular area is wedge shaped of increasing width in the direction towards said tubular member internal cylindrical surface.

6. A viewport assembly according to claim 1 wherein said frame ring has an integral inwardly extending flange portion adjacent said inner end and wherein said frame ring inner circumferential surface is threaded and including:

a window retaining ring having an inner and an outer cylindrical surface and an outer and an inner end, the window retaining ring being threadably received within said frame ring; and means of retaining said window disc between said frame ring and said window retaining ring.

7. A viewport assembly according to claim 6 wherein said window retaining ring has an integral inwardly extending flange portion at said outer end and wherein said window disc outer surface is defined by an integral, reduced external diameter portion providing a circumferential ledge substantially conforming to said window retaining ring flange portion.

8. A viewport assembly according to claim 1 including plural packing rings received in tandem on said frame ring outer cylindrical surface between said integral flange and said gland ring tubular portion forward end.

9. A viewport assembly according to claim 8 wherein said packing rings are separated by spacer rings.

10. An assembly for sealably closing a tubular member having an internal cylindrical surface comprising:

a frame member having an outer cylindrical surface defined in part by a radially outwardly extending flange portion, the frame member having a plurality of spaced apart bolt openings therethrough;

a gland ring having a forward and a rearward end and having, at the forward end, an integral forwardly extending tubular portion having a forward end, the gland ring tubular portion being telescopically receivable on said frame member outer cylindrical surface rearwardly of said flange portion providing an annular area externally of said frame member between said frame member flange and said gland ring tubular portion forward end, the gland ring having a plurality of spaced apart threaded openings therein in register with said frame member openings;

an elastomeric packing ring received in said annular area; and a bolt received in each of said frame member bolt openings and threadably engaging said gland ring threaded openings whereby as the bolts are tightened said gland ring is drawn towards said frame member flange portion compressing said packing ring sealingly outwardly.

11. An assembly for sealably closing a tubular member according to claim 10 wherein said frame member has a window opening therethrough and including:

a transparent window disc; and means to sealably retain said window disc in said frame member window opening.

12. An assembly for sealably closing a tubular member according to claim 11 wherein said frame member has a large diameter opening therethrough providing an inner circumferential surface having an integral inner annular flange portion at said outer end thereof and wherein said window disc has an outer surface defined by an integral, reduced external diameter portion providing a circumferential ledge substantially conforming to the frame member inner annular flange portion.

13. An assembly for sealably closing a tubular member according to claim 12 wherein said frame member inner circumferential surface has an annular groove therein spaced from said frame member inner annular flange portion and wherein said window disc has a circumferential cylindrical edge; and an O-ring received in said annular groove compressibly engaging said window disc cylindrical edge.

14. An assembly for sealably closing a tubular member according to claim 12 wherein said frame member inner circumferential surface has an annular groove therein spaced from said frame member inner annular flange portion; and a locking ring positioned in said annular groove, said window disc being received between said frame member inner flange portion and said locking ring.

15. An assembly for sealably closing a tubular member according to claim 10 wherein said frame member outwardly extending flange portion has an inner surface that is inclined outwardly at an angle in the direction towards said frame member outer end and wherein said gland ring tubular portion forward end is inclined at an angle towards said gland ring rearward end whereby said annular area is wedge shaped of increasing width in the radially outward direction.

16. An assembly for sealably closing a tubular member according to claim 11 wherein said frame member has an inner and an outer end and has an integral inwardly extending flange portion adjacent said inner end partially defining said window opening and wherein said frame member inner circumferential surface forwardly of said integrally extending flange portion is threaded and including:

a window retaining ring having an inner and an outer cylindrical surface and an outer and an inner end, the window retaining ring being threadably received within said frame ring, the window retaining ring having an integral inwardly extending flange portion at said outer end and wherein said window disc outer surface is defined by an integral, reduced external diameter portion providing a circumferential ledge substantially conforming to said window retaining ring flange portion.

17. An assembly for sealably closing a tubular member according to claim 10 including a plurality of said elastomeric packing rings received in tandem on said frame ring outer cylindrical surface between said integral flange and said gland ring tubular portion forward end.

18. An assembly for sealably closing a tubular member according to claim 17 wherein said packing rings are separated by spacer rings.

19. A viewport assembly for use with a tubular member having an internal cylindrical surface comprising:
- a frame ring having an outer end and an inner end and having an outer circumferential surface and an inner circumferential surface, the outer circumferential surface being defined in part by an outwardly radially extending flange portion adjacent said frame ring outer end, and having a plurality of spaced apart openings therethrough extending from said outer to said inner end;
- a window disc having a cylindrical edge and outer and inner surfaces;
- means of securing said window disc to said frame ring inner circumferential surface;
- a gland ring having a forward and a rearward end, the forward end having an integral forwardly extending tubular portion having a forward end, the gland ring tubular portion being telescopically receivable on said frame ring outer circumferential surface rearwardly of said flange portion and providing an annular area external of said frame ring between said frame ring flange and said gland ring tubular portion forward end, the gland ring having a plurality of spaced apart threaded openings therein in register with frame ring openings;
- an elastomeric packing ring received on said frame ring outer cylindrical surface between said integral flange and said gland ring tubular portion forward end; and
- a bolt received in each of said frame ring openings and threadably engaging said gland ring threaded openings whereby as the bolts are tightened said gland ring is drawn towards said frame ring, compressing and outwardly sealingly expanding said packing ring.

20. A viewport assembly according to claim 19 wherein said frame ring has an integral inner annular flange portion at said outer end thereof and wherein said window disc outer surface is defined by an integral, reduced external diameter portion providing a circumferential ledge substantially conforming to the frame ring inner annular flange portion.

21. A viewport assembly according to claim 20 wherein said frame ring inner circumferential surface has an annular groove therein spaced from said frame ring inner annular flange portion; and
- an O-ring received in said annular groove compressibly engaging said window disc cylindrical edge.

22. A viewport assembly according to claim 20 wherein said frame ring inner circumferential surface has an annular groove therein spaced from said frame ring inner annular flange portion; and
- a locking ring positioned in said annular groove and in engagement with said window disc inner surface, said frame ring inner flange portion and said locking ring serving as said means of securing said window member disc to said frame ring.

23. A viewport assembly according to claim 19 wherein said frame ring outwardly extending flange portion has an inner surface that is inclined outwardly at an angle in the direction towards said frame ring outer end and wherein said gland ring tubular portion forward end is inclined at an angle towards said gland ring rearward end whereby said annular area is wedge shaped of increasing width in the direction towards said tubular member internal cylindrical surface.

24. A bulk material apparatus, comprising:
- a means for transporting bulk material having a bulk material container therein;
- an ullage tube communicating with said container and having an internal cylindrical surface;
- a frame ring having an outer end and an inner end and having an outer circumferential surface and an inner circumferential surface, the outer circumferential surface being defined in part by an outwardly radially extending flange portion adjacent said frame ring outer end, and having a plurality of spaced apart openings therethrough extending from said outer to said inner end, the diameter of said flange portion being less than the diameter of said ullage tube internal cylindrical surface;
- a window disc having a cylindrical edge and outer and inner surfaces;
- means of securing said window member disc to said frame ring inner circumferential surface;
- a gland ring having a forward and a rearward end and having an outer diameter less than the diameter of said ullage tube internal cylindrical surface, the forward end having an integral forwardly extending tubular portion having a forward end, the gland ring tubular portion being telescopically receivable on said frame ring outer circumferential surface rearwardly of said flange portion and providing an annular area external of said frame ring between said frame ring flange and said gland ring tubular portion forward end, the gland ring having a plurality of spaced apart threaded openings therein in register with frame ring openings;
- an elastomeric packing ring received on said frame ring outer cylindrical surface between said integral flange and said gland ring tubular portion forward end; and
- a bolt received in each of said frame ring openings and threadably engaging said gland ring threaded openings whereby as the bolts are tightened said gland ring is drawn towards said frame ring, compressing said packing ring into outwardly expanded sealed contact with said ullage tube internal cylindrical surface.

25. A bulk material apparatus according to claim 24 wherein said frame ring has an integral inner annular flange portion at said outer end thereof and wherein said window disc outer surface is defined by an integral, reduced external diameter portion providing a circumferential ledge substantially conforming to the frame ring inner annular flange portion.

26. A bulk material apparatus according to claim 25 wherein said frame ring inner circumferential surface has an annular groove therein spaced from said frame ring inner annular flange portion; and
- an O-ring received in said annular groove compressibly engaging said window disc cylindrical edge.

27. A bulk material apparatus according to claim 25 wherein said frame ring inner circumferential surface has an annular groove therein spaced from said frame ring inner annular flange portion; and
- a locking ring positioned in said annular groove and in engagement with said window disc inner surface, said frame ring inner flange portion and said locking ring serving as said means of securing said window member disc to said frame ring.

28. A bulk material apparatus according to claim 24 wherein said frame ring outwardly extending flange portion has an inner surface that is inclined outwardly at an angle in the direction towards said frame ring outer end and wherein said gland ring tubular portion forward end is inclined at an angle towards said gland ring rearward end whereby said annular area is wedge shaped of increasing width in the direction towards said ullage tube internal cylindrical surface.

* * * * *